United States Patent Office 2,819,259
Patented Jan. 7, 1958

2,819,259

NEW METALLIFEROUS AZO-DYESTUFFS

Max Schmid, Riehen, Rudolf Mory, Dornach, and Christian Zickendraht, Binningen, Switzerland, assignors to Ciba Limited, Basel, Switzerland, a Swiss firm No Drawing. Application February 26, 1954
Serial No. 412,955

Claims priority, application Switzerland February 27, 1953

13 Claims. (Cl. 260—147)

The present invention is based on the observation that valuable new metalliferous azo-dyestuffs are obtained by treating monoazo-dyestuffs which are free from sulfonic acid groups and carboxylic acid groups and have the formula (1)  $R_1-N=N-R_2$ wherein $R_1$ represents a naphthalene radical bound in 1-position to the azo group, substituted in 2-position by a hydroxyl group and in 4-position by a sulfonic acid amide group, and $R_2$ stands for the radical of an azo component containing a hydroxyl group, which radical is bound to the azo linkage in a position vicinal to the hydroxyl group, or the —O-acyl derivatives of these dyestuffs, with agents yielding chromium or cobalt in such a way that metalliferous dyestuffs are formed which contain in complex union less than one atom of chromium or cobalt per molecule of monoazo-dyestuff.

The starting dyestuffs of the Formula 1 are advantageously prepared by converting ortho:ortho'-dihydroxy-monoazo-dyestuffs free from carboxylic acid groups, whose azo group is bound on the one hand in 1-position to a naphthalene radical substituted by a sulfonic acid group in 4-position and on the other hand to the radical of an azo-component, into —O-acyl derivatives, by converting in the latter the sulfonic acid groups by the action of phosphorus compounds of pentavalent phosphorus with at least 3 halogen atoms in an inert solvent or dispersing medium into sulfonic acid halide groups, converting the latter into sulfonic acid amide groups and, if desired, hydrolyzing the —O-acyl groups in the sulfonic acid amides thus obtained.

The ortho:ortho'-dihydroxy-azo-dyestuffs containing sulfonic acid groups required for this purpose are obtained by methods in themselves known by coupling diazotized 1-amino-2-hydroxynaphthalene-4-sulfonic acids, such as for example 6-nitro-, 6-chloro- or 6-methoxy-1-amino-2-hydroxynaphthalene-4-sulfonic acid, more particularly the otherwise unsubstituted 1-amino-2-hydroxynaphthalene-4-sulfonic acid with azo-components coupling in a position vicinal to a hydroxyl group. As such there may be considered as usual also those coupling in a position vicinal to an enolizable or enolized keto group, such as for example acetoacetylaminobenzenes or especially pyrazolones. Among the latter there may be mentioned more especially the 1-phenyl-3-methyl-5-pyrazolones, which may contain in the phenyl radical further substituents, for example methyl or methoxy groups, halogen atoms, such as chlorine or sulfonic acid groups.

Those dyestuffs are of especial interest which are obtained by coupling the mentioned diazo compounds with hydroxynaphthalenes coupling in a position vicinal to the hydroxyl group. As examples, there may be mentioned 1-hydroxynaphthalene, 2-hydroxynaphthalene, 1-hydroxy-4-methylnaphthalene, 1-hydroxy-5:8-dichloronaphthalene, and hydroxynaphthalene sulfonic acids such as 1-hydroxynaphthalene-3-, -4-, -5-, or -8-sulfonic acid and 2-hydroxynaphthalene-4-, -5-, -6-, or -7-sulfonic acid.

As is known, it is possible to couple in 2-position diazotized 1-amino-2-hydroxynaphthalene-4-sulfonic acid also with those 1-hydroxynaphthalenes which, like 1-hydroxynaphthalene itself, otherwise couple in 4-position.

The ortho:ortho'-dihydroxymonoazo-dyestuffs containing sulfonic acid groups can be converted in the form of free acids or as alkali salts into the —O-acyl derivatives. Dyestuffs with more than one sulfonic acid group can also be so converted, in such a way that the sulfonic acid groups are only partially present as alkali sulfonate groups. Depending on their constitution the one or other form may sometimes prove especially advantageous for acylation and subsequent reaction with the phosphorus compounds.

As the acyl groups only serve to protect the hydroxyl groups in ortho-position to the azo group during treatment with the phosphorus compounds and are split off again afterwards, it is generally advisable to carry out the acylation with easily accessible acylating agents or those having a simple constitution. In many cases acylating agents have proved especially advantageous which yield acyl radicals of low molecular weight, preferably those derived from aliphatic carboxylic acids, such as for example the propionyl- or particularly the acetyl radical. There may be used anhydrides or halides of such acids, for example butyric acid chloride, propionic acid chloride, acetyl chloride or acetic acid anhydride.

In other cases particularly for the acylation of monoazo-dyestuffs of which the azo group is bound on both sides to a naphthalene nucleus, it is advisable to use derivatives of aromatic carboxylic acids, especially of benzoyl chloride, as the dibenzoylated compounds are more suitable for the subsequent reaction with phosphorus halides than for example the acetyl compounds.

In general it is advantageous to use dry dyestuffs for the acylation and to carry out this reaction in an inert solvent and dispersing medium. If the dyestuffs still contain water, it can be removed in many cases by azeotropic distillation. This method of acylation not only offers the advantage of a smooth course of reaction, but is also usually suitable because the subsequent treatment has also to be carried out in an inert dispersing medium and therefore in the absence of water. Organic dispersing mediums are used preferably. As such there come into consideration for example hydrocarbons, such as benzene, toluene, xylenes, substituted benzenes, such as nitrobenzene, monochlorobenzene, di- and trichloro-benzenes which are liquid at room temperature, and compounds of another kind, such as dioxane, or tertiary bases, such as pyridine, or mixtures of dispersing mediums of the mentioned kind. The acylations are carried out preferably at a raised temperature, for example within the range of 70 to 100° C.

The acyl compounds so obtained can, if desired, be separated off from the reaction mixture. As a rule, it is possible to do without such an intermediate separation and, after completing the acylation, carry out the treatment with the phosphorus compounds in the same reaction mixture.

As phosphorus compounds of pentavalent phosphorus with at least 3 halogen atoms there may be used, for example, phosphorus-oxybromide or phosphorus-oxychloride, especially phosphorus pentahalides, such as phosphorus pentabromide or preferably phosphorus pentachloride. The phosphorus pentahalides can also be used in combination with phosphorus oxyhalides, the latter serving in the first place not as halogenating agents but as inorganic dispersing agents. When the reaction is carried out with a phosphorus oxyhalide, any excess of this halogenating agent can serve as dispersing agent.

Depending on the choice of the dispersing agent and the constitution of the dyestuff there may be differences in the favorable reaction temperature, so that in some cases, at least at the beginning of the reaction, a cooling of the mixture is convenient, whilst in other cases gentle heating is advisable after the reaction has been begun at room temperature. In the case of too vigorous reaction conditions there is a risk of secondary reactions.

The resulting sulfonic acid halides can be obtained from the reaction mixture by conventional methods, for example by pouring the mixture on to ice, which is to be recommended for water-miscible dispersing agents like dioxane, and then filtered off, the residue washed free from acid and cautiously dried, for example in vacuo at a slightly raised temperature. When the reaction mixture contains a dispersing agent which is sparingly soluble or insoluble in water, it is as a rule advantageous to filter off from the sulfonic acid halide formed after the reaction has been completed and if necessary after cooling, if the acid halide is difficultly soluble in the cold dispersing agent. If it is easily soluble and does not precipitate off sufficiently in the cold, it can as a rule be precipitated from the solution by dilution with another solvent, such as for example petroleum ether. The acid halides so obtained can in general be readily recrystallized from organic solvents, such as benzene, chlorobenzene, nitrobenzene, ligroin, glacial acetic acid, acetone, trichloro-ethylene and thus in the most cases obtained analytically pure.

The sulfonic acid halides obtained when reacting dyestuffs containing sulfonic acid groups with phosphorus compounds can for the purpose of converting sulfonic acid halide groups into sulfonic acid amide groups be condensed with compounds having at least one —NH— group by conventional methods.

Apart from ammonia there come into consideration for this condensation, for example, also primary or secondary monoamines. As examples there may be mentioned monomethylamine, monoethylamine, dimethylamine, piperidine or morpholine.

The condensation of the sulfonic acid halides with the amines can be carried out in an anhydrous medium and in some cases also in an aqueous medium. It usually occurs surprisingly easily even at temperatures which lie within the boiling range of normal organic solvents, such as ethanol, benzene, acetone, toluene, monochlorobenzene, dichlorobenzene, nitrobenzene. In order to speed up the reaction it is often advisable to use an acid-binding agent, such as sodium acetate or pyridine. As a rule an excess of the base in question can advantageously serve as such. When using strongly basic amines, hydrolysis of the —O-acyl groups may occur in some cases in addition to the reaction on the sulfonic acid halide group.

According to the present process the ortho:ortho'-dihydroxymonoazo-dyestuffs thus obtained containing sulfonic acid amide groups and corresponding to Formula 1 are treated in the way described hereinbefore with agents yielding chromium or cobalt after or while splitting off the acyl groups.

The splitting off of the acyl groups from the products primarily obtained generally proceeds very easily. The acyl groups are bound so loosely in some sulfonic acid halides that hydrolysis often occurs when isolating the halides, if such isolation takes place, or while being left in the air, but more especially during the reaction with ammonia or amines at a raised temperature. Even if there are still acyl radicals in the ortho:ortho'-dihydroxy-azo grouping in the dyestuffs to be metallized, no special hydrolysis is necessary in some cases, because the splitting off of the acyl groups takes place spontaneously during the usual metallizing methods.

The treatment of the monoazo-dyestuffs of the Formula 1 with the agents yielding chromium or cobalt is carried out in such a way that metalliferous dyestuffs are formed which contain in complex union less than one atom of chromium or cobalt per molecule of monoazo-dyestuff.

Accordingly, metallization is preferably carried out with those agents yielding chromium or cobalt and according to those methods which usually yield complex chromium or cobalt compounds which contain one atom of chromium or cobalt bound in complex union to two molecules of monoazo-dyestuff. It is generally advisable to use per one molecule of a monoazo-dyestuff less than one but at least ½ atom of chromium or cobalt and/or to carry out the metallization in a weakly acid to alkaline medium. Accordingly those chromium and cobalt compounds which are stable in an alkaline medium are especially suitable for carrying out the process, such as for example chromium and cobalt compounds of aliphatic hydroxycarboxylic acids or dicarboxylic acids or preferably chromium compounds of aromatic ortho-hydroxycarboxylic acids which contain the chromium or cobalt in complex union. As examples of aliphatic hydroxy-carboxylic acids or dicarboxylic acids there may be mentioned among others lactic acid, oxalic acid, glycollic acid, citric acid and especially tartaric acid, whilst of the aromatic ortho-hydroxy-carboxylic acids there may be mentioned for example those of the benzene series, such as 4-, 5- or 6-methyl-1-hydroxybenzene-2-carboxylic acid and particularly the otherwise unsubstituted 1-hydroxybenzene-2-carboxylic acid. As agents yielding cobalt, simple compounds of divalent cobalt such as cobalt acetate or sulfate, possibly also cobalt hydroxide, are also suitable. With these simple cobalt compounds the desired 1:2-complexes are also obtained, if metallization is carried out in a neutral or alkaline medium.

The conversion of the dyestuffs into complex chromium or cobalt compounds is advantageously carried out in the hot, open or under pressure, for example at boiling temperature of the reaction mixture, if desired, in the presence of suitable adjuvants, for example in the presence of salts of organic acids, of bases, organic solvents or other agents promoting the formation of the complex.

A special method of carrying out the present metallizing process is characterized by using mixtures of various metallizable monoazo-dyestuffs of the kind mentioned as starting materials.

Another method of carrying out the present metallizing process consists in using mixtures of agents yielding metals, for example mixtures of agents yielding chromium and cobalt.

The new metalliferous dyestuffs obtained according to the present process are metal compounds of ortho:ortho'-dihydroxymonoazo-dyestuffs free from sulfonic acid and carboxylic acid groups containing less than one atom of chromium or cobalt in complex union per molecule of dyestuff and having the formula $$R_1-N=N-R_2$$ 

wherein $R_1$ represents a naphthalene radical bound in 1-position to the azo group, substituted in 2-position by a hydroxyl group and in 4-position by a sulfonic acid amide group, and $R_2$ stands for the radical of an azo component containing a hydroxyl group which is bound to the azo linkage in a position vicinal to the hydroxyl group.

These metalliferous dyestuffs are soluble in water and in a weakly acid, aqueous medium and are more easily soluble than the metal free dyestuffs used as starting materials for their manufacture. They are suitable for the dyeing and printing of various materials, more especially for the dyeing of animal materials, such as silk, leather and particularly wool, but also for the dyeing and printing of synthetic fibers from superpolyamides and superpolyurethanes. In contrast to the chromium compounds of dyestuffs containing sulfonic acid groups with which dyeings are advantageously made from strongly acid, for example sulfuric acid, baths, these new chromium and cobalt compounds of monoazo-dyestuffs free from sulfonic acid groups are especially suited for dyeing from weakly alkaline, neutral to weakly acid, preferably acetic acid, baths. The wool dyeings thus obtained are characterized by levelness, good fastness to decatizing and carbonizing, good fastness to wet treatments and very good fastness to light.

The following examples illustrate the invention, the parts and percentages being by weight unless otherwise stated.

EXAMPLE 1

39.4 parts of the dyestuff acid, which is obtained by coupling diazotized 1-amino-2-hydroxynaphthalene-4-sulfonic acid with 2-hydroxy-naphthalene, are placed in a well dried condition in 200 parts by volume of dry pyridine. 35 parts by volume of benzoyl chloride are added dropwise in the course of 20 minutes, the mixture is heated for 2 hours at 40 to 50° C. and then allowed to cool again. The whole is filtered with suction and the solid product consisting of small pale yellow needles is washed with dilute hydrochloric acid. The pale strawyellow product is dried in vacuo at 70 to 80° C.

22 parts of phosphorus pentachloride are added in portions in the course of half an hour to 31 parts of the benzoylated dyestuff in 130 parts by volume of chlorobenzene. After stirring the mixture for 3–4 hours at room temperature, it is filtered and the residue consisting uniformly of slight curved small pale yellow needles is washed with petroleum ether and dried. The dyestuff chloride can be freed from any acidly reacting impurities by treatment with water.

Instead of 35 parts by volume of benzoyl chloride there may be used 52.5 parts of para-chlorobenzoyl chloride with the same good results.

Instead of using chlorobenzene as diluent or solvent there may be used toluene, benzene or xylene.

A mixture of 68 parts of this dyestuff acid chloride, 370 parts by volume of chlorobenzene and 185 parts by volume of ammonia of 25 percent strength is stirred for 1 hour at room temperature, then for 3 hours at 80–90° C. After adding 200 parts by volume of 5 N-sodium hydroxide solution, the temperature of the mixture is maintained for another ½ hour at 80–90° C. and the chlorobenzene subsequently distilled off with steam. The remaining solution while still hot is rendered acid to Congo with about 100 parts by volume of 10 N-hydrochloric acid, filtered with suction while hot, and the residue washed thoroughly with hot water until the washing water drains off free from acid and almost colorless. The sulfonic acid amide of the starting dyestuff obtained in this way is a brown powder when dry.

3.93 parts of the sulfonic acid amide are dissolved in 100 parts of water and 2.6 parts of a solution of sodium hydroxide of 30 percent strength and after the addition of 12 parts of a solution of sodium chromosalicylate with a chromium content of 2.6 percent boiled for 3 hours under reflux. At the end of this time chroming is complete. The dyestuff is separated off by neutralizing with acetic acid, filtered and dried. It is the chromium compound of the monoazo-dyestuff of the formula

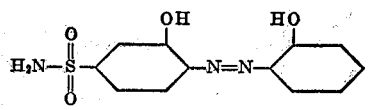

which compound contains the monoazo-dyestuff so bound in complex union to the chromium that the ratio of the number of the chromium atoms bound in complex union to the number of monoazo-dyestuff molecules is about 1:2, and dyes wool from an acetic or neutral bath in blue tints of very good fastness properties.

When the above mentioned sulfonic acid amide is dissolved in 100 parts of water and 4.0 parts of a sodium hydroxide solution of 30 percent strength there is obtained after the addition of 30 parts of a cobalt sulfate solution with a cobalt content of 1.3 percent and heating for half an hour at 80–85° C., the cobalt compound of the dyestuff. The complex is isolated by evaporating the solution. It dyes wool from an acetic or neutral bath in violet tints having very good fastness properties.

The following table contains a number of other metalliferous monoazo-dyestuffs which can be prepared by coupling the diazo compound of the amine mentioned in column I with the azo component mentioned in column II, preparing the O-acylated monazo-dyestuff sulfonic acid chloride, reacting the latter with the amine mentioned in column III, and metallising the resulting, if necessary deacylated, monoazo-dyestuff sulfonic acid amide with the metal given in column IV. The tints of their dyeings on wool are given in column V. Further details about the preparation of the dyestuff sulfonic acid amides to be metallized in the above mentioned way are given at the end of the table.

| | I Diazo component | II Azo component | III Condensation Component | IV Metal | V Dyeing on wool |
|---|---|---|---|---|---|
| 1 | 1-amino-2-hydroxy-naphthalene-4-sulfonic acid. | 1-acetoacetyl-amino-2-chloro-benzene. | morpholine | Co | yellow brown. |
| 2 | do | 1-phenyl-3-methyl-5-pyrazolone. | do | Cr | bordeaux red. |
| 3 | do | do | dimethylamine | Cr | Do. |
| 4 | do | do | aniline | Cr | Do. |
| 5 | do | do | isopropylamine | Cr | Do. |
| 6 | do | do | 1-amino-4-methoxy-benzene. | Cr | Do. |
| 7 | do | 2-hydroxynaphthalene | aniline | Cr | blue. |
| 8 | do | do | methylamine | Cr | Do. |
| 9 | do | do | 2-methoxy-1-amino-benzene. | Cr | Do. |
| 10 | 1-amino-6-nitro-2-hydroxy-naphthalene-4-sulfonic acid. | do | methylamine | Cr | gray. |
| 11 | do | do | dimethylamine | Cr | Do. |
| 12 | 1-amino-2-hydroxy-naphthalene-4 sulfonic acid. | do | aniline | Co | reddish violet. |
| 13 | do | 1-hydroxynaphthalene-8-sulfonic acid. | isopropylamine | Cr | blue. |

The monoazo-dyestuff No. 2 of the table has the formula

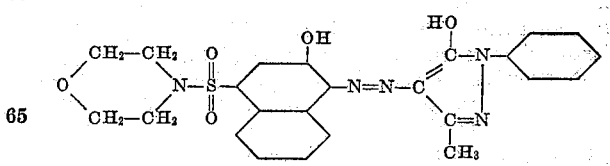

The monoazo-dyestuff No. 5 of the table has the formula

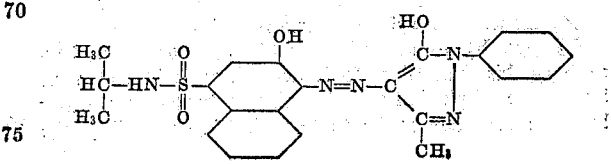

The monoazo-dyestuff No. 10 of the table has the formula

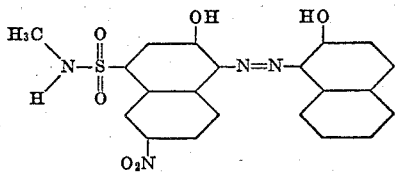

The monoazo-dyestuff No. 12 of the table has the formula

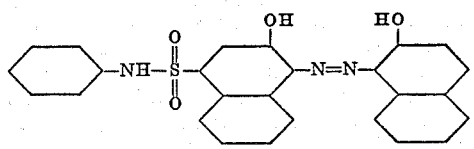

*Preparation of the sulfonic acid amides*

NO. 1 OF THE TABLE 46.15 parts of the dyestuff acid obtained by coupling diazotized 1-amino-2-hydroxynaphthalene-4-sulfonic acid with 1-acetoacetylamino-2-chlorobenzene are introduced into a mixture of 200 parts by volume of glacial acetic acid and 150 parts by volume of acetic anhydride. The mixture is heated for 2 hours in an oil bath at 130 to 150° C., then stirred cold. The solid product consisting uniformly of thin, pale yellow needles is filtered off, washed with ether and dried in vacuo at 60–70° C.

To the dyestuff pretreated in this way there are added 350 parts by volume of chlorobenzene. From the mixture 150 parts by volume of liquid are distilled out. After cooling, 39 parts of phosphorus pentachloride are introduced in the course of half an hour and the whole is then stirred for 16 hours at room temperature. The dyestuff acid chloride is then separated off by filtration, washed with petroleum ether and dried in vacuo at a low temperature. It has a yellow color.

The sulfonic acid morpholide of the dyestuff is obtained by heating a mixture of the sulfonic acid chloride prepared according to the above described directions, 100 parts by volume of dry benzene and 28 parts by volume of morpholine to 80–90° C. for 1½ hours, filtering the cooled mixture, drying the filter residue and carefully washing the latter with hot water. The product is a yellow powder.

NO. 2 OF THE TABLE 27 parts of the dyestuff acid obtained by coupling diazotized 1-amino-2-hydroxynaphthalene-4-sulfonic acid with 1-phenyl-3-methyl-5-pyrazolone are prepared in 250 parts by volume of chlorobenzene. The mixture is completely dehydrated by distilling off 100 parts by volume of liquid. After the addition of 35.5 parts by volume of acetyl chloride the whole is maintained for 16 hours at a bath temperature of 80–90° C. Then 41 parts of phosphorus pentachloride are introduced into the suspension consisting of rectangular flakes in the course of half an hour at room temperature. The whole is then heated for 2–3 hours in a bath at 50–60° C. and then allowed to cool again. The sulfonic acid chloride consisting of large yellow prisms is filtered with suction and washed with petroleum ether. It is a pale brick red powder which when recrystallized from trichloroethylene yields red needles which are orange when seen against the light. The combustion analysis would appear to indicate that it is monoacetylated sulfonic acid chloride of the starting dyestuff.

Instead of chlorobenzene there may be used as diluent or solvent toluene, xylene or ortho-dichlorbenzene.

6.1 parts by volume of morpholine are added to 14.5 parts of this dyestuff sulfonic acid chloride in 100 parts by volume of alcohol and the mixture heated in a water bath for an hour at 80 to 90° C. After cooling, the whole is filtered with suction, washed with hot water and the product is dissolved for further purification in hot alcohol by the addition of concentrated aqueous sodium hydroxide solution and precipitated again with concentrated aqueous hydrochloric acid, then suction-filtered and washed with hot water free from acid. In a dry state the sulfonic acid morpholide is a brilliant scarlet colored powder and can be obtained in an analytically pure form by recrystallization from chlorobenzene. It melts at 246–247° C. with decomposition.

NOS. 3, 4, 5 AND 6 OF THE TABLE

The sulfonic acid amides Nos. 3, 4, 5 and 6 can be prepared in an analogous manner, when sulfonic acid chloride No. 2 is used as starting material and the following directions are carried out, column I showing the condensation base, column II the reaction medium, column III the duration and temperature of the reaction, and column IV the end product.

|   | I | II | III | IV |
|---|---|---|---|---|
| 3 | dimethylamine of 20% strength. |   | 1 hour 80–90° C | brilliant red powder. |
| 4 | aniline | benzene | 1 hour 80–90° C | red crystal powder. |
| 5 | isopropylamine of 50% strength. | ethanol | 2 hours 80–90° C | brilliant red powder. |
| 6 | 1-amino-4-methoxy-benzene. | benzene | 5 hours 80–90° C | brown red powder. |

NOS. 7 AND 12 OF THE TABLE 18.6 parts of the benzoylated dyestuff sulfonic acid chloride described in the first and second paragraphs of this example are heated together with 50 parts by volume of dry benzene and 13.7 parts by volume of aniline for 3 hours at 80–90° C. After the reaction mixture has been allowed to cool while stirring, the solid product is suction-filtered, dried and purified by being dissolved in hot alcohol with the addition of sodium hydroxide solution of 30% strength, reprecipitation with hydrochloric acid of 30% strength, washing with cold alcohol and hot water. The sulfonic acid anilide prepared in this way is a brown powder.

NOS. 8 AND 9 OF THE TABLE

The sulfonic acid amides Nos. 8 and 9 can be prepared in an analogous manner to No. 7 if the same sulfonic acid chloride is used as starting material and the following directions are carried out, column I showing the condensation base, column II the reaction medium, column III the duration and temperature of the reaction and column IV the end products.

|   | I | II | III | IV |
|---|---|---|---|---|
| 8 | methylamine of 30% strength. | benzene | 2 hours 50–60° C | brown powder. |
| 9 | 1-amino-2-methoxy-benzene. | benzene | 6 hours 80°90° C | red brown powder. |

NO. 10 OF THE TABLE

The dyestuff sulfonic acid obtained by coupling diazotized 6 - nitro - 1 - amino-2-hydroxynaphthalene-4-sulfonic acid with 2-hydroxynaphthalene can be converted into the corresponding benzoylated dyestuff sulfonic acid chloride if the phosphorus pentachloride is allowed to react for 16 hours and the procedure described in the first and second paragraphs of this example is followed.

For the preparation of the sulfonic acid methyl amide a mixture of 33.3 parts of this sulfonic acid chloride is heated with 125 parts by volume of dry benzene and 50 parts by volume of a methylamine solution of 30 percent strength for 2 hours at 70–80° C. The benzene is then distilled off and the product consisting of dark blue needles is isolated by filtration after the suspension has been stirred cold. After washing with boiling water thoroughly, the sulfonic acid methyl amide of the dyestuff appears as a dark green bronzy crystal powder.

NO. 11 OF THE TABLE

For the preparation of the sulfonic acid dimethylamide of the dyestuff obtained by coupling diazotized 6-nitro-1-amino-2-hydroxynaphthalene-4-sulfonic acid with 2-hydroxynaphthalene, the same chloride is used as starting material as in No. 10. 30 parts of the chloride are stirred with 120 parts by volume of a dimethylamine solution of 30 percent strength for 2 hours at 20° C., then heated for 1 hour at 80–90° C. and stirred cold again for 16 hours. The whole is filtered, the residue taken up again in dilute hydrochloric acid, suction-filtered again and thoroughly washed with boiling water. The sulfonic acid dimethylamide of the dyestuff is a black bronzy powder.

NO. 13 OF THE TABLE

The benzoylated sulfonic acid chloride of the dyestuff obtained by coupling diazotized 1-amino-2-hydroxynaphthalene-4-sulfonic acid with 1-hydroxynaphthalene-8-sulfonic acid, can be prepared in an analogous manner to the sulfonic acid chloride described in paragraphs 1 and 2 of this example. To 23.2 parts of the benzoylated sulfonic acid chloride 100 parts by volume of benzene and 21.5 parts by volume of isopropylamine are added and the mixture is stirred first for half an hour at room temperature, then half an hour at 40–50° C. and finally half an hour at 80–90° C. The working up of the so-obtained product may be carried out according to the usual methods known per se.

EXAMPLE 2

0.5 part of the cobaltiferous dyestuff obtained according to Example 1, paragraph 7, is dissolved in 4000 parts of water and 100 parts of well wetted wool are entered in the resulting dyebath at 40 to 50° C. 2 parts of acetic acid of 40 percent strength are then added, and brought to the boil within ½ hour and dyeing is carried on for two hours at the boil. Finally the wool is rinsed with cold water and dried. There is obtained a level violet tint of good fastness to washing, decatizing, carbonizing and light.

If 100 parts of superpolyamide fibers (nylon fibers) are used instead of 100 parts of wool, a violet tint is also obtained according to this example.

The same result is also obtained if no acetic acid is added to the dyebath.

What is claimed is:

1. A metal compound selected from the group consisting of chromium and cobalt compounds of an ortho:ortho'-dihydroxymonoazo-dyestuff free from sulfonic and carboxylic acid groups, which compound contains the monoazo-dyestuff so bound in complex union to the metal that the ratio of the number of the metal atoms bound in complex union to the number of monoazo-dyestuff molecules is substantially 1:2, and which compound contains a monoazo dyestuff corresponding to the formula $$R_1-N=N-R_2$$

wherein $R_1$ represents a naphthalene radical bound in 1-position to the azo group, substituted in 2-position by a hydroxyl group and in 4-position by a sulfonic acid amide group, and $R_2$ represents a radical selected from the group consisting of naphtholic and enolic coupling components bound to the azo linkage in a position vicinal to the hydroxyl group.

2. A chromium compound of an ortho:ortho'-dihydroxymonoazo-dyestuff free from sulfonic and carboxylic acid groups, which compound contains the monoazo-dyestuff so bound in complex union to the chromium that the ratio of the number of the chromium atoms bound in complex union to the number of monoazo dyestuff molecules is about 1:2, and which compound contains a monoazo-dyestuff corresponding to the formula $$R_1-N=N-R_2$$

wherein $R_1$ represents a naphthalene radical bound in 1-position to the azo group, substituted in 2-position by a hydroxyl group and in 4-position by a sulfonic acid amide groups, which compound contains the monoazo-dyestuff so consisting of naphtholic and enolic coupling compounds bound to the azo linkage in a position vicinal to the hydroxyl group.

3. A cobalt compound of an ortho:ortho'-dihydroxymonoazo-dyestuff free from sulfonic and carboxylic acid groups, compound contains the monoazo-dyestuff so bound in complex union to the cobalt that the ratio of the number of the cobalt atoms bound in complex union to the number of monoazo dyestuff molecules is about 1:2, and which compound contains a monoazo-dyestuff corresponding to the formula $$R_1-N=N-R_2$$

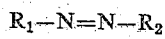

wherein $R_1$ represents a naphthalene radical bound in 1-position to the azo group, substituted in 2-position by a hydroxyl group and in 4-position by a sulfonic acid amide group, and $R_2$ represents a radical selected from the group consisting of naphtholic and enolic coupling components bound to the azo linkage in a position vicinal to the hydroxyl group.

4. A chromium compound of an ortho:ortho'-dihydroxymonoazo-dyestuff free from sulfonic and carboxylic acid groups, which compound contains the monoazo-dyestuff so bound in complex union to the chromium that the ratio of the number of the chromium atoms bound in complex union to the number of monoazo-dyestuff molecules is about 1:2, and which compound contains a monoazo dyestuff corresponding to the formula $$R_1-N=N-R_2$$

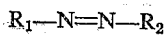

wherein $R_1$ represents a naphthalene radical bound in 1-position to the azo group, substituted in 2-position by a hydroxyl group and in 4-position by a sulfonic acid amide group, and $R_2$ represents the radical of a 1-phenyl-3-methyl-5-pyrazolone bound in its 4-position to the azo group.

5. A chromium compound of an ortho:ortho'-dihydroxymonoazo-dyestuff free from sulfonic and carboxylic acid groups, which compound contains the monoazo dyestuff so bound in complex union to the chromium that the ratio of the number of the chromium atoms bound in complex union to the number of monoazo-dyestuff molecules is about 1:2, and which compound contains a monoazo dyestuff corresponding to the formula

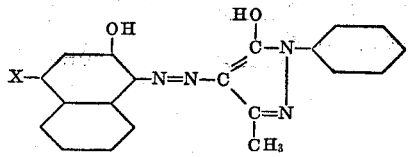

wherein X represents a sulfonic acid amide group.

6. A chromium compound of an ortho:ortho'-dihydroxymonoazo-dyestuff free from sulfonic and carboxylic acid groups, which compound contains the monoazo dyestuff so bound in complex union to the chromium that the ratio of the number of the chromium atoms bound in complex union to the number of monoazo-dyestuff molecules is about 1:2, and which compound contains a monoazo-dyestuff corresponding to the formula $$R_1-N=N-R_2$$

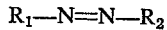

wherein $R_1$ represents a naphthalene radical bound in 1-position to the azo group, substituted in 2-position by a hydroxyl group and in 4-position by a sulfonic acid amide group, and $R_2$ represents the radical of a 2-hydroxynaphthalene bound to the azo group in its 1-position.

7. A chromium compound of an ortho-ortho'-dihydroxymonoazo-dyestuff free from sulfonic and carboxylic acid groups, which compound contains the monoazo-dyestuff so bound in complex union to the chromium that the ratio of the number of the chromium atoms bound in complex union to the number of monoazo-dyestuff molecules is about 1:2, and which compound contains a monoazo dyestuff corresponding to the formula

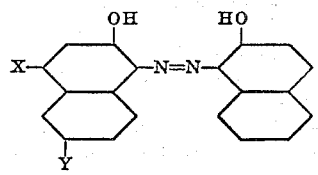

wherein X represents a sulfonic acid amide group and Y represents a member selected from the group consisting of a hydrogen atom and a nitro group.

8. A cobalt compound of an ortho:ortho'-dihydroxy-monoazo-dyestuff free from sulfonic and carboxylic acid groups, which compound contains the monoazo-dyestuff so bound in complex union to the cobalt that the ratio of the number of the cobalt atoms bound in complex union to the number of monoazo-dyestuff molecules is about 1:2, and which compound contains a monoazo-dyestuff corresponding to the formula

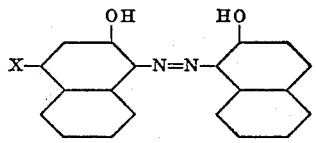

wherein X represents a sulfonic acid amide group.

9. A chromium compound of the ortho:ortho'-dihydroxymonoazo-dyestuff of the formula

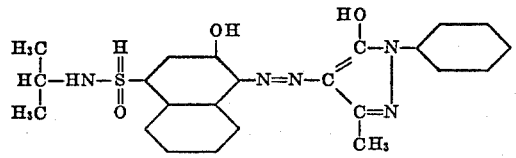

which compound contains the monoazo-dyestuff so bound in complex union to the chromium that the ratio of the number of the chromium atoms bound in complex union to the number of monoazo-dyestuff molecules is about 1:2.

10. A chromium compound of the ortho:ortho'-dihydroxymonoazo-dyestuff of the formula

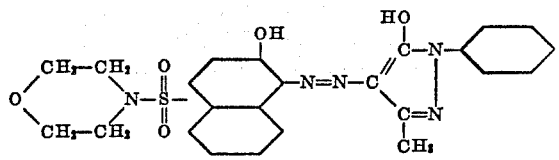

which compound contains the monoazo-dyestuff so bound in complex union to the chromium that the ratio of the number of the chromium atoms bound in complex union to the number of monoazo-dyestuff molecules is about 1.2.

11. A chromium compound of the ortho:ortho'-dihydroxymonoazo-dyestuff of the formula

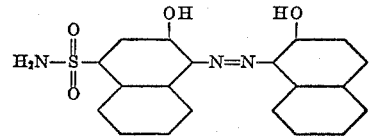

which compound contains the monoazo-dyestuff so bound in complex union to the chromium that the ratio of the number of the chromium atoms bound in complex union to the number of monoazo-dyestuff molecules is about 1:2.

12. A chromium compound of the ortho:ortho'-dihydroxymonoazo-dyestuff of the formula

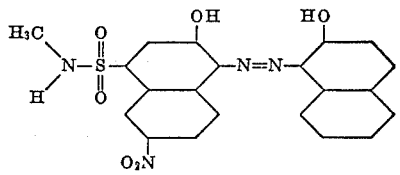

which compound contains the monoazo-dyestuff so bound in complex union to the chromium that the ratio of the number of the chromium atoms bound in complex union to the number of monoazo-dyestuff molecules is about 1:2.

13. A cobalt compound of the ortho:ortho'-dihydroxymonoazo-dyestuff of the formula

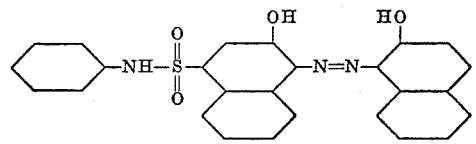

which compound contains the monoazo-dyestuff so bound in complex union to the cobalt that the ratio of the number of the cobalt atoms bound in complex union to the number of monoazo-dyestuff molecules is about 1:2.

References Cited in the file of this patent

UNITED STATES PATENTS

| | | |
|---|---|---|
| 1,480,640 | Straub et al. | Jan. 15, 1924 |
| 1,677,534 | Straub et al. | July 17, 1928 |
| 2,537,098 | Slipkin et al. | Jan. 9, 1951 |
| 2,606,185 | Widmer et al. | Aug. 5, 1952 |
| 2,674,515 | Widmer et al. | Apr. 6, 1954 |

FOREIGN PATENTS

| | | |
|---|---|---|
| 316,231 | Great Britain | July 23, 1929 |

U. S. DEPARTMENT OF COMMERCE
PATENT OFFICE

CERTIFICATE OF CORRECTION

Patent No. 2,819,259                          January 7, 1958

Max Schmid et al.

It is hereby certified that error appears in the printed specification of the above numbered patent requiring correction and that the said Letters Patent should read as corrected below.

Column 10, line 8, for "groups, which compound contains the monoazo-dyestuff so" read -- group, and $R_2$ represents a radical selected from the group --; column 12, line 4, for "1.2" read -- 1:2 --.

Signed and sealed this 27th day of May 1958.

(SEAL)

Attest:
KARL H. AXLINE

Attesting Officer

ROBERT C. WATSON
Commissioner of Patents